(12) United States Patent
Guyton et al.

(10) Patent No.: US 10,348,345 B2
(45) Date of Patent: Jul. 9, 2019

(54) EQUALIZATION OF RECEIVER

(71) Applicants: Matthew C. Guyton, Arlington, MA (US); Xiao Wang, Cambridge, MA (US)

(72) Inventors: Matthew C. Guyton, Arlington, MA (US); Xiao Wang, Cambridge, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 0 days.

(21) Appl. No.: 15/410,427

(22) Filed: Jan. 19, 2017

(65) Prior Publication Data

US 2018/0048340 A1 Feb. 15, 2018

Related U.S. Application Data

(60) Provisional application No. 62/280,166, filed on Jan. 19, 2016.

(51) Int. Cl.
*H03H 7/30* (2006.01)
*H04B 1/10* (2006.01)
(Continued)

(52) U.S. Cl.
CPC ......... *H04B 1/1036* (2013.01); *H04B 1/1027* (2013.01); *H04B 1/1638* (2013.01);
(Continued)

(58) Field of Classification Search
CPC ... H04B 1/1036; H04B 7/005; H04L 25/0222; H04L 27/01; H04L 25/03019; H04L 25/022
(Continued)

(56) References Cited

U.S. PATENT DOCUMENTS 7,313,370 B2 12/2007 Branson
7,346,134 B2 3/2008 Smith
(Continued)

OTHER PUBLICATIONS

Meaamar, Ali "An Ultra-Wideband Receiver Front-end," Thesis, The Nanyang Technological University, 2010; 127 pages.
(Continued)

*Primary Examiner* — Dhaval V Patel
(74) *Attorney, Agent, or Firm* — Schmeiser, Olsen & Watts LLP

(57) ABSTRACT

Methods and systems for equalization of a first receiver. A method may include receiving an input signal at the first receiver. The method may also include receiving the input signal at a second receiver. The method may further include determining, from an output response of the second receiver, an estimate of an out-of-channel interferer present in the input signal. The method may also include determining an estimate, of an undesired in-channel response of the first receiver to the out-of-channel interferer present in the input signal. The method may include applying the estimate, of the undesired in-channel response of the first receiver to the out-of-channel interferer present in the input signal, to an output signal of the first receiver to substantially cancel an instance of an undesired in-channel response of the first receiver to the out-of-channel interferer.

10 Claims, 11 Drawing Sheets

(51) Int. Cl.
*H04L 1/00* (2006.01)
*H04B 1/16* (2006.01)
*H04B 7/005* (2006.01)
*H04L 25/02* (2006.01)
*H04L 25/03* (2006.01)
*H04L 27/01* (2006.01)
*H04L 27/22* (2006.01)
*H04L 27/38* (2006.01)

(52) U.S. Cl.
CPC .............. *H04B 7/005* (2013.01); *H04L 1/00* (2013.01); *H04L 25/022* (2013.01); *H04L 25/0222* (2013.01); *H04L 25/03019* (2013.01); *H04L 27/01* (2013.01); *H04L 27/22* (2013.01); *H04L 27/38* (2013.01)

(58) Field of Classification Search
USPC ....... 375/232, 229, 233, 260, 267, 295, 296, 375/316, 343
See application file for complete search history.

(56) References Cited

U.S. PATENT DOCUMENTS

| | | | |
|---|---|---|---|
| 7,643,811 B2 * | 1/2010 | Reunamaki | H04B 1/005 455/132 |
| 7,773,967 B2 | 8/2010 | Smith | |
| 7,796,068 B2 | 9/2010 | Raz et al. | |
| 8,874,153 B2 | 10/2014 | Bevan et al. | |
| 9,413,420 B1 * | 8/2016 | Kong | H04W 72/044 |
| 2003/0021367 A1 * | 1/2003 | Smith | H04B 1/123 375/346 |
| 2004/0152429 A1 | 8/2004 | Haub et al. | |
| 2006/0014506 A1 * | 1/2006 | Haartsen | H04B 17/318 455/227 |
| 2007/0092015 A1 | 4/2007 | Hart et al. | |
| 2009/0261808 A1 | 10/2009 | Quan | |
| 2013/0310023 A1 | 11/2013 | Bevan et al. | |
| 2014/0029660 A1 | 1/2014 | Bolstad et al. | |
| 2014/0051378 A1 | 2/2014 | Daneshrad et al. | |
| 2014/0086300 A1 * | 3/2014 | Jameson | H04L 25/03057 375/233 |
| 2016/0352369 A1 | 12/2016 | Smith | |
| 2016/0365883 A1 | 12/2016 | Tu et al. | |

OTHER PUBLICATIONS

Boyd, et al., "Measuring Volterra Kernels," IEEE Transactions on Circuits and Systems, Aug. 1983, pp. 571-577, vol. cas-30, No. 8.
Chua, Leon O. and Youlin Liao "Measuring Volterra Kernels (II)," International Journal of Circuit Theory and Applications, 1989, pp. 151-190, vol. 17.
Lee, Kyehun "Coherent Mitigation of Radio Frequency Interference in 10-100 MHz," Dissertation, Virginia Polytechnic Institute and State University, Aug. 28, 2008, Blacksburg, Virginia; 264 pages.
Ru, et al. "Digitally Enhanced Software-Defined Radio Receiver Robust to Out-of-Band Interference," IEEE Journal of Solid-State Circuits, Dec. 2009, pp. 3359-3375, vol. 44, No. 12.
Goldman, Joel "A Volterra Series Description of Crosstalk Interference in Communications Systems," The Bell System Technical Journal, May-Jun. 1973, pp. 649-668, vol. 52, No. 5.
Huang, et al. "Inter-channel Nonlinearity Equalization Based on Volterra Series in Polarization-Division-Multiplexed WDM Systems," 19 Asia-Pacific Conference on Communications (APCC), 2013, pp. 620-621, Bali, Indonesia.
Kawahara, et al. "Proposal of compensation for intra- and inter-channel nonlinear distortions using optical compensation and non-linear equalization," Electronics Letters, Aug. 18, 2016, pp. 1471-1472, vo. 52, No. 17.
Allen, M. "Nonlinear Distortion in Wideband Radio Receivers and Analog-to-Digital Converters: Modeling and Digital Suppression," Tampere University of Technology, 2015, vol. 1329; 207 pages.
Redfern, Arhtur J. and G. Tong Zhou, "An Iterative Multichannel Method for Blind Volterra System Equalization," IEEE, 1999, pp. 247-250.
Zhou, et al. "Efficient Adaptive Nonlinear Echo Cancellation Using Sub-band Implementation of the Adaptive Volterra Filter," IEEE ICASSP, 2006, pp. 277-280.
International Search Report & Written Opinion in counterpart International Patent Application No. PCT/US17/14141, dated Apr. 7, 2017; 6 pages.
International Preliminary Report on Patentability in PCT/US17/14141 dated Aug. 2, 2018; 5 pages.

* cited by examiner

EQUALIZATION OF RECEIVER

RELATED APPLICATIONS

This application claims the benefit of the earlier filing date of U.S. Provisional Patent Application No. 62/280,166, filed Jan. 19, 2016 and titled "Wideband Equalization of Narrowband Receiver," the entirety of which is incorporated herein by reference.

GOVERNMENT RIGHTS IN THE INVENTION

This invention was made with government support under Contract No. FA8721-05-C-0002 awarded by the U.S. Air Force. The government has certain rights in the invention.

FIELD OF THE INVENTION

The present disclosure relates generally to methods and systems for equalization of systems which may be receivers. More particularly, the disclosure relates to methods of estimating undesired responses of narrowband systems and substantially cancelling the undesired responses.

BACKGROUND OF THE INVENTION

A receiver may be tuned to demodulate one channel out of many channels which make up a radio frequency (RF) signal band. A channel selection process in, for example, a receiver, may typically be accomplished by using one or more mixing operations and filters. Because it may be difficult to design a highly selective channel filter at an RF carrier frequency, the mixing operations may typically be preceded by a less selective band-select filter with a wide passband that encompasses the entire signal band. After demodulation with a mixer, a low-pass channel-select antialiasing filter and an analog-to-digital converter (ADC) may digitize the channel signal. The components of the receiver before the mixer may be referred to as "RF front-end" components and the components after the mixer may be referred to as "baseband" components of the receiver.

Because real-life components of RF receivers may not be perfectly linear, one or more components in the signal chain of a receiver may add some nonlinear distortion. In other words, a component may artificially add frequencies to an output signal of that component. The artificially added frequencies did not originally exist at the component's input signal. For example, if a component with 2nd-order distortion has a pair of tones at its input with frequencies f1 and f2, then the signal at the component's output may exhibit not only the original tones at f1 and f2, but also intermodulation products which are created at frequencies which are combinations of the original input frequencies (e.g., 0, 2*f1, 2*f2, f1+f2, and f131 f2). It is important to recognize that intermodulation products may fall at frequencies different than the original tones which created them.

Because intermodulation products may fall at frequencies different than the original tones which created them, nonlinear RF front-end components can create in-channel intermodulation products in response to out-of-channel signals. This type of distortion may detrimentally decrease the receiver's spurious-free dynamic range (SFDR) because there may be no inherent way to distinguish the intermodulation products from the desired signals. As a result, there may be a need to identify such intermodulation products and remove them to maintain RF signal integrity in receivers.

SUMMARY

In one aspect, the present disclosure describes one or more methods for equalization of a first receiver, which may include receiving an input signal at the first receiver. A method may also include receiving the input signal at a second receiver. The method may further include determining, from an output response of the second receiver, an estimate of an out-of-channel interferer present in the input signal. The method may additionally include determining an estimate, of an undesired in-channel response of the first receiver to the out-of-channel interferer present in the input signal, based on a predetermined model. The method may also include applying the estimate, of the undesired in-channel response of the first receiver to the out-of-channel interferer present in the input signal, to an output signal of the first receiver to substantially cancel an instance of an undesired in-channel response of the first receiver to the out-of-channel interferer present in the input signal.

In an implementation, the first receiver is a narrowband receiver and the second receiver is a wideband receiver. The wideband receiver may be configured to receive a wider signal range than the narrowband receive. The wideband receiver may be configured to receive a plurality of narrowband channels. The wideband receiver may include a plurality of narrowband receivers.

In an implementation determining the estimate, of the undesired in-channel response of the first receiver to the out-of-channel interferer present in the input signal, based on the predetermined model, may be performed at a signal processing module in communication with the second receiver and the first receiver.

In another aspect, the present disclosure describes one or more systems for equalization of a first receiver, which may include the first receiver. A system may also include a second receiver. The system may further include a signal processing module in communication with the second receiver and the first receiver. The signal processing module may be configured to determine, from an output signal generated by the second receiver, an estimate of an out-of-channel interferer present in an input signal of the first receiver. The signal processing module may also be configured to estimate, an undesired in-channel response of the first receiver to the out-of-channel interferer present in the input signal, based on a pre-determined model. The signal processing module may additionally be configured to apply the estimate, of the undesired in-channel response of the first receiver to the out-of-channel interferer present in the input signal, to an output signal of the first receiver to substantially cancel an instance of an undesired in-channel response of the first receiver to the out-of-channel interferer present in the input signal.

In an implementation, the first receiver may be a narrowband receiver and the second receiver is a wideband receiver. The wideband receiver may be configured to receive a wider signal range than the narrowband receiver. The wideband receiver may be configured to receive a plurality of narrowband channels. The wideband receiver may include a plurality of narrowband receivers.

In one aspect, the present disclosure describes one or more methods for calibrating a system for equalization of a first receiver, which may include applying a multi-tone input signal to the first receiver. The method may also include applying the multi-tone input signal to a second receiver. The method may additionally include determining amplitudes of tones at intermodulation frequencies from an output of the first receiver. The method may further include determining amplitudes of tones at input frequencies from an output of the second receiver. The method may also include mapping the amplitudes of the tones at the intermodulation frequencies determined from the output of the first receiver to the amplitudes of the tones at the input frequencies determined from the output of the second receiver.

In an implementation, the method may further include applying the mapping to achieve equalization of the first receiver. The first receiver may be a narrowband receiver and the second receiver may be a wideband receiver. The method may further include applying the mapping to achieve wideband equalization of the narrowband receiver.

In another aspect, the present disclosure describes one or more methods for equalization of a first system, which may include receiving an input signal at the first system. A method may also include receiving the input signal at a second system. The method may further include determining, from an output response of the second system, an estimate of an out-of-channel interferer present in the input signal. The method may additionally include determining an estimate, of an undesired in-channel response of the first system to the out-of-channel interferer present in the input signal, based on a predetermined model. The method may also include applying the estimate, of the undesired in-channel response of the first system to the out-of-channel interferer present in the input signal, to an output signal of the first system to substantially cancel an instance of an undesired in-channel response of the first system to the out-of-channel interferer present in the input signal.

In another aspect, the present disclosure describes one or more systems for equalization of a first system, which may include the first system. A system may also include a second system. The system may further include a signal processing module in communication with the second system and the first system. The signal processing module may be configured to determine, from an output signal generated by the second system, an estimate of an out-of-channel interferer present in an input signal of the first system. The signal processing module may also be configured to estimate, an undesired in-channel response of the first system to the out-of-channel interferer present in the input signal, based on a pre-determined model. The signal processing module may additionally be configured to apply the estimate, of the undesired in-channel response of the first system to the out-of-channel interferer present in the input signal, to an output signal of the first system to substantially cancel an instance of an undesired in-channel response of the first system to the out-of-channel interferer present in the input signal.

In another aspect, the present disclosure describes one or more methods for calibrating a system for equalization of a first system, which may include applying a multi-tone input signal to the first system. The method may also include applying the multi-tone input signal to a second system. The method may additionally include determining amplitudes of tones at intermodulation frequencies from an output of the first system. The method may further include determining amplitudes of tones at input frequencies from an output of the second system. The method may also include mapping the amplitudes of the tones at the intermodulation frequencies determined from the output of the first system to the amplitudes of the tones at the input frequencies determined from the output of the second system.

In another aspect, the first and second or wideband and narrowband receivers may not be separate physical entities. The first and second or wideband and narrowband receivers may be part of a system in a single chip. In an implementation, a high speed ADC may come first, and then the first and second or wideband and narrowband receivers may be implemented as separate paths in a single component. They may be co-integrated with the ADC or immediately following it in an FPGA.

BRIEF DESCRIPTION OF THE DRAWINGS

The above and further advantages of the present disclosure may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

DETAILED DESCRIPTION

Figure 1:
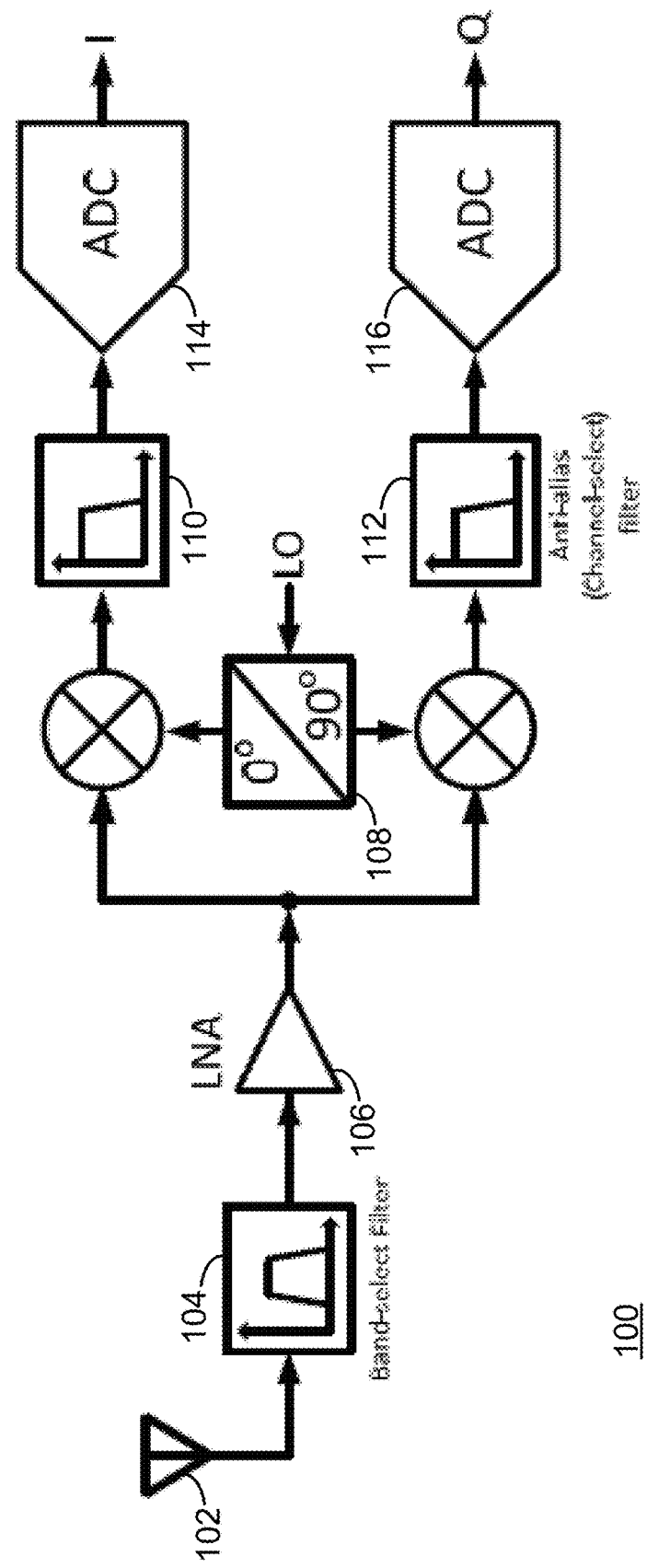
FIG. 1 shows an example architecture of a receiver in accordance with the present disclosure.

In brief overview, the techniques and features described in the present disclosure may include or be implemented in methods and systems to achieve equalization of systems which may be receivers and, in some implementations, to achieve wideband equalization of narrowband systems, such as receivers. More particularly, the present disclosure relates to methods of modeling and estimating undesired responses of narrowband systems, such as receivers, and substantially cancelling the undesired responses.

It should be noted that receivers are used as an example system as described herein and that the techniques and features of the present disclosure may be applied to other nonlinear systems which may not be characterized as receivers.

In an implementation, a process for wideband equalization of a narrowband receiver may include receiving an input signal at a narrowband receiver. The narrowband receiver may also be referred to as a first receiver. The process may also include receiving the input signal at a wideband receiver. The wideband receiver may be referred to as a second receiver. The process may additionally include determining an estimate of an out-of-channel interferer present in the input signal. The estimate may be determined from an output response of the wideband receiver. The process may further include determining an estimate of an undesired in-channel response of the narrowband receiver to the out-of-channel interferer present in the input signal. The estimate may be determined based on a predetermined model. Moreover, the process may include applying the estimate (i.e., the estimate of the undesired in-channel response of the narrowband receiver to the out-of-channel interferer present in the input signal) to an output signal of the narrowband receiver. Applying the estimate to the output signal of the narrowband receiver may substantially cancel an instance of an undesired in-channel response of the narrowband receiver (i.e., an undesired response to the out-of-channel interferer present in the input signal).

In communication systems, multiple signals may be kept separate by a predetermined or chosen basis. For example, the multiple signals may be kept separate by frequency, time, phase, code, etc. The present disclosure discusses the basis of signal separation as frequency for illustrative purposes only but it should be noted that the techniques and features described herein may be applied across any choice of signal separation basis (e.g., frequency, time, phase, code, etc.)

Further, in communication systems, a receiver may provide an output signal. The output signal may be based on a desired portion of an input signal. For example, at any given moment, a narrowband receiver may be a receiver that is intended to receive a desired subset of a full range of separated signals. The present disclosure may refer to a channel as that desired subset of the full range of separated signals. An out-of-channel signal may be one which is outside of the desired channel.

The signal or component chain of a narrowband receiver may include various filters. The various filters may block out-of-channel interferer signals from propagating through the signal chain of the narrowband receiver from the input to the output.

In some communications systems, non-idealities (i.e. saturation of a component) may be encountered early in the signal chain. The present disclosure may refer to the non-idealities as nonlinearity because the non-idealities may allow a signal in one channel to have an effect on another channel (this is in contrast to linear non-idealities, such as attenuation, which may only cause effects within the same channel).

In some systems, a radio frequency (RF) receiver's (e.g., a narrowband receiver or a first receiver) dynamic range may be detrimentally affected by signals which are outside of a desired channel. These signals (i.e. large signals in other channels, or jamming signals) may be referred to as out-of-channel interferers. The out-of-channel interferers may enter the receiver and pass through one or more pre-select filters which do not completely reject signals outside of the desired channel. The out-of-channel interferers may encounter nonlinear behavior in the receiver's signal or component path. As a result, in-channel intermodulation products may appear. For example, nonlinearity in the narrowband receiver's RF front end, e.g., in the low noise amplifier (LNA), may create in-channel intermodulation products in response to out-of-channel interferers. The in-channel intermodulation products may reduce the spurious-free dynamic range of the receiver by saturating and desensitizing components in the signal chain. Note that these interferer signals may later be filtered by a channel-select filter or antialias filter further down the signal chain of the narrowband receiver.

A wideband receiver may be capable of simultaneously or near simultaneously receiving some portion of a full range of signals beyond a range of signals that may be received at a given moment by the narrowband receiver. For example, the wideband receiver may be able to receive multiple narrowband channels simultaneously or near simultaneously. These multiple narrowband channels may or may not include the narrowband receiver's channel. It should be noted that the wideband receiver may include or be a representation of multiple other narrowband receivers.

In order to mitigate the effect of the in-channel intermodulation products, a second receiver (e.g., a wideband receiver) may be introduced to the system. The second receiver may be used to detect the out-of-channel interferers in an input signal. Once the out-of-channel interferers are identified, a nonlinear equalization filter may be used to cancel the undesirable intermodulation products in a narrowband receiver output.

Digital nonlinear equalization (NLEQ) techniques may be used to remove undesirable intermodulation products from a digitized signal. In one or more digital NLEQ techniques, nonlinear behavior of a system may be characterized and/or modelled by observing the system's response to various input signals. A possible implementation of a model for a nonlinear system could be a Volterra representation. Note that the model of a nonlinear system may be more simple if a system operates at soft nonlinearity, that is, where intermodulation products occur at a much lower power than the original tones which created them. It may also simplify the model if the nonlinearity is of low order, with the significance of Volterra terms decreasing as order increases. Using such a model, a received channel signal may be analyzed in real-time or near real-time in order to determine if intermodulation products are created and to identify the intermodulation products. The original tones may be identified and any artificial intermodulation products created by those tones may be cancelled.

One limitation of traditional equalization techniques may be that they can only be used to cancel intermodulation products created in response to interferers which are known. For example, a digital equalizer may only know signals which have a digital representation. Thus, intermodulation products created in a receiver in response to in-channel interferers may be cancelled by a digital equalizer because the in-channel interferers may be known by being digitized by an analog-to-digital converter (ADC). In contrast, digital NLEQ techniques may not be appropriate for use in cancelling intermodulation products created by out-of-channel interferers because out-of-channel signals may be rejected by an antialiasing filter and may never be digitized by an ADC.

Referring now to FIG. 1, a standard direct conversion or generic homodyne receiver architecture is shown. Receiver 100 shown in FIG. 1 is shown for illustrative purposes only and other nonlinear systems and other receivers are within the scope of the present disclosure, and may be implemented to achieve the techniques and features described herein. Receiver 100 may include one or more components in its signal or component chain. Those components may include antenna 102, band-select filter 104, low-noise amplifier (LNA) 106, local oscillator (LO) 108, anti-alias or channel-select filters 110 and 112, and analog-to-digital converters (ADCs) 114 and 116.

Figure 2:
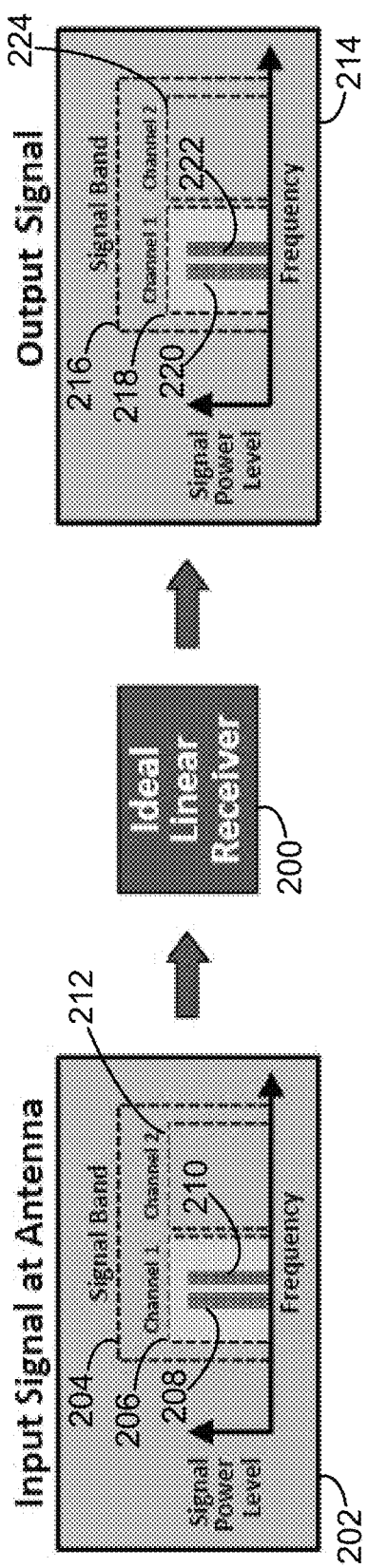
FIG. 2 shows example input and output signal plots for a linear receiver in accordance with the present disclosure.

Receiver 100 may be representative of a narrowband receiver as discussed in the present disclosure. Receiver 100 may be a non-ideal receiver with nonlinear distortion. Referring now to FIG. 2, assume for illustrative purposes that an input signal 202 is applied to an antenna of an ideal linear receiver 200 (in contrast with non-ideal receiver 100). Although a two-tone input is used as an example, the techniques, features, and results described herein may be extended to any arbitrary input signals. Input signal 202 may have a signal band 204 including one or more channels. A first channel or channel 206 (i.e., "Channel 1") may include two tones (e.g., tones 208 and 210), each tone occurring at a certain frequency. In this example, a second channel 212 may not include any tones. It should be noted that for illustrative purposes only, any frequency shifting effect of any mixing operation is not shown in these plots.

Also shown in FIG. 2 is an output signal 214, shown for illustrative purposes only. For simplicity of illustration, the frequency translation effect of any mixer on the output signal is not shown. The signal 214 may also illustrate an input signal, which when applied to the antenna of an ideal linear receiver 200, may create the same output from the ideal linear receiver. For example, output signal 214 has signal band 216 including channel 218 with tones 220 and 222 and channel 224 with no tones. Because receiver 200 is ideal and linear, output signal 214 is the same as the true input signal or input signal 202.

While receiver 200 is ideal and linear, receiver 100 of FIG. 1 may be more representative of a real world receiver used in modern day communications applications and may be non-ideal and/or nonlinear. In other words, receiver 100 may experience or cause distortion. In an implementation, receiver 100 may experience distortion at LNA 106 after band-select filter 104. For example, this distortion may consist of 3rd order intermodulation, where intermodulation products may be created at combinations of three input frequencies. If tones f1 and f2 are inputs to a component (e.g., LNA 106) with 3rd-order intermodulation distortion, outputs will be not only at frequencies f1 and f2, but also at nearby frequencies 2*f1−f2, and 2*f2−f1. Additionally, there may also be 3rd-order intermodulation products at 2*f1+f2 and 2*f2+f1, but those frequencies may be easily filtered out in the signal or component chain of receiver 100.

Figure 3:
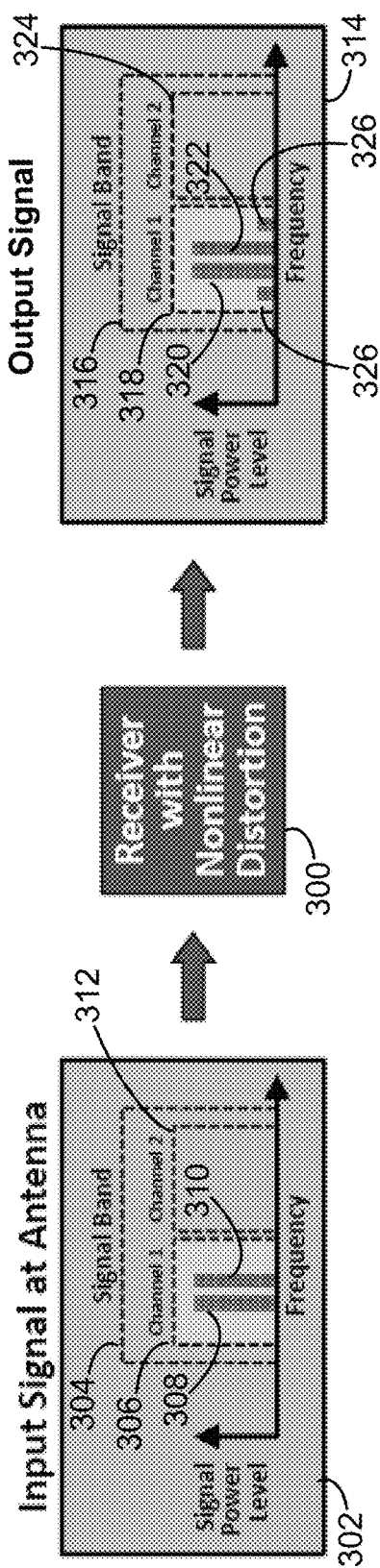
FIG. 3 shows example input and output signal plots for a nonlinear receiver in accordance with the present disclosure.

Assume, for illustrative purposes only, that a two-tone signal is input to an antenna of a narrowband receiver, which may be similar to receiver 100 of FIG. 1. For example, and referring now also to FIG. 3, the two-tone signal may be input signal 302 to an antenna of a receiver 300 with nonlinear distortion (e.g., non-ideal receiver 100). Input signal 302 may have a signal band 304 including one or more channels. A first channel or channel 306 (i.e., "Channel 1" as shown in FIG. 3) may include two tones (e.g., tones 308 and 310), each tone occurring at a certain frequency. In this example, a second channel 312 may not include any tones. As shown in FIG. 3, input signal 302 includes tones 308 and 310 in one channel (306, "channel 1") but not in the other channel (312, "channel 2").

The 3rd-order intermodulation distortion in receiver 300 may create undesired distortion products in an output signal. For example, output signal 314 may have signal band 316 including channel 318 ("channel 1") with tones 320 and 322 and channel 324 ("channel 2") with no tones. Additionally, output signal 314 includes distortion products 326 and 328 in channel 318. In this example, it may not be possible to determine from output signal 314 of receiver 300 whether distortion products 326 and 328 are actually tones from input signal 302 (i.e., in the case of receiver 300 being an ideal receiver responding to 4 tones) or distortion products as shown in FIG. 3 (i.e., in the case of receiver 300 being a non-ideal receiver as shown and responding to two tones but additionally generating distortion products 326 and 328 due to nonlinearities in receiver 300).

As discussed above, using various techniques such as digital NLEQ, a model of a receiver's nonlinear distortion may be used to examine the receiver's output and predict the true input signal. However, referring now to also to FIG. 4, in some circumstances, it may not be possible to determine whether certain tones in the output signal are desired or undesired, even when using a model of the receiver's nonlinear distortion.

Figure 4:
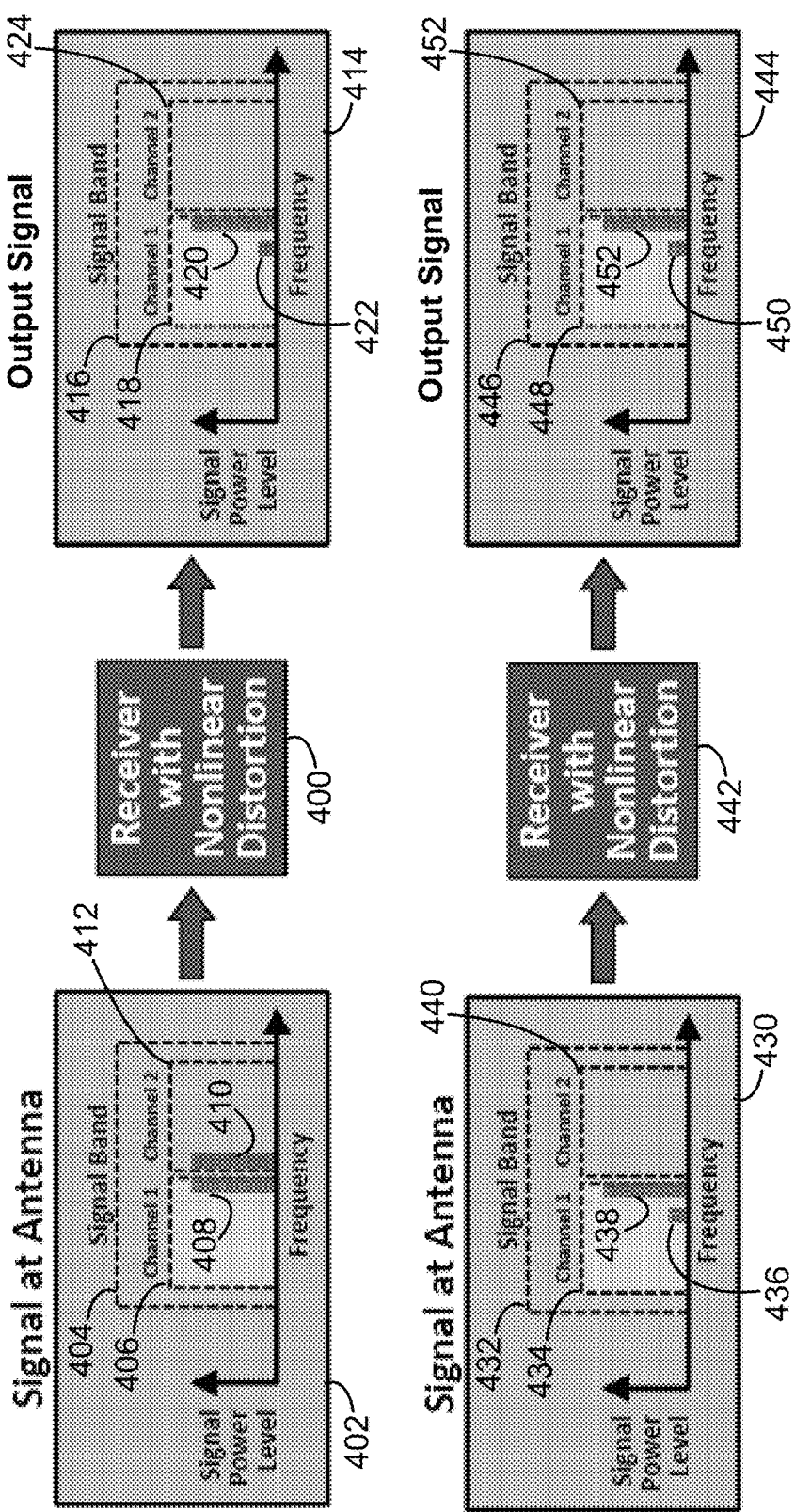
FIG. 4 also shows example input and output signal plots for a nonlinear receiver in accordance with the present disclosure.

As shown in FIG. 4, input signal 402 may have a signal band 404 including one or more channels. A first channel or channel 406 (i.e., "Channel 1" as shown in FIG. 4) may include tone 408, which may occur at a certain frequency. In this example, a second channel 412 may include tone 410, which may also occur at a certain frequency. As shown in FIG. 4, input signal 402 includes tone 408 in one channel (406, "channel 1") and tone 410 in another channel (412, "channel 2").

The 3rd-order intermodulation distortion or nonlinear distortion in receiver 400 may create undesired distortion products in an output signal. For example, output signal 414 may have signal band 416 including channel 418 ("channel 1") with tone 420 and distortion product 422. A second channel 424 may not include any tones or distortion products because they may have been filtered out in the signal chain, such as by an antialias filter.

Additionally shown in FIG. 4 is input signal 430 which may have a signal band 432 including one or more channels. A first channel or channel 434 (i.e., "Channel 1" as shown in FIG. 4) may include tones 436 and 438, which may occur at certain frequencies. A second channel 440 may not include any tones.

Receiver 442 may have output signal 444, which may have signal band 446 including channel 448 ("channel 1") with tones 450 and 452. A second channel 452 may not include any tones or distortion products. The 3rd-order intermodulation distortion or nonlinear distortion in receiver 442 may or may not create undesired distortion products in an output signal such as output signal 444 or in a particular channel such as channels 448 and 452. 3rd-order intermodulation distortion or nonlinear distortion in receiver 442 may create undesired distortion but those undesired distortion products may not be visible because they may occur below a dynamic range of receiver 442.

Referring now also to FIG. 1 and as shown in FIG. 4, a channel-select filter (such as channel-select filter 110 or 112) of receiver 400 may filter out one of the input tones (e.g., tone 410 in channel 412 or channel 2) after one or more distortion products (e.g., distortion product 422) are created. This may cause ambiguity in determining what the desired tones of the input signal are. Even with using various techniques such as digital NLEQ and/or a receiver model, it may not be possible to figure out whether the small tone in the output signal is desired (e.g., tone 450 in output signal 444) or undesired (e.g., distortion product 422). Ambiguity in determining what the desired tones of the input signal are may be problematic in various communication systems and applications.

Figure 5:
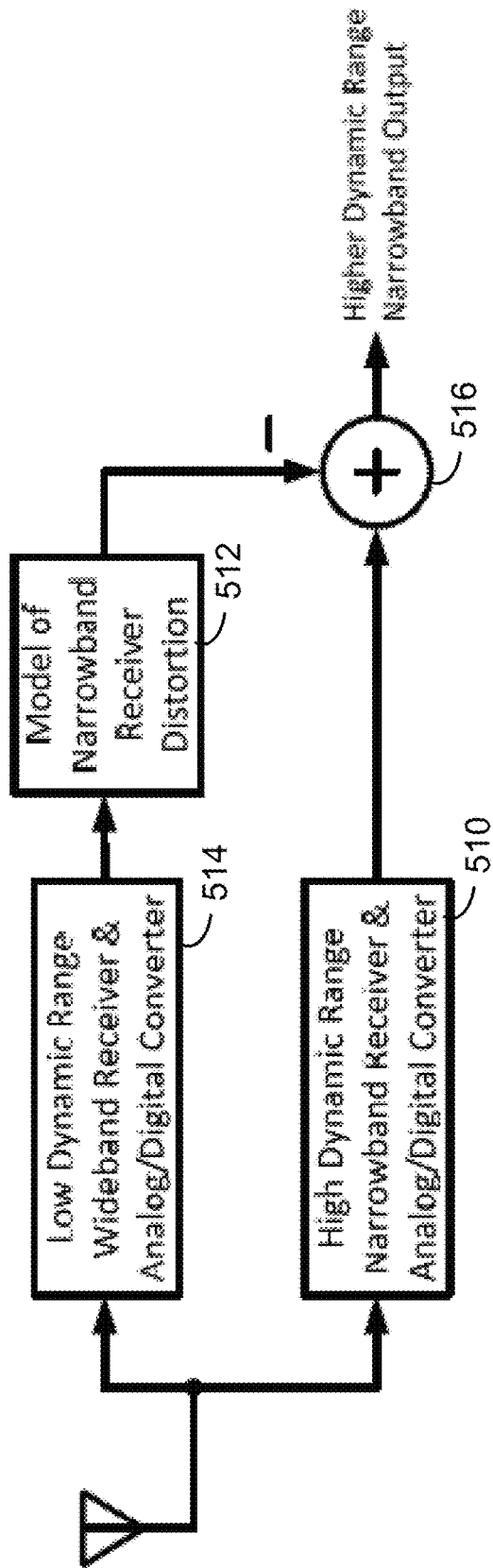
FIG. 5 shows an example system implementation for equalization of a first receiver in accordance with the present disclosure.

The ambiguity in determining what the desired tones of the input signal are, as demonstrated in FIG. 4 and discussed above, may be resolved using the techniques and features described in the present disclosure. Referring now to FIG. 5, a system 500 for wideband equalization of a narrowband receiver is shown. In some implementations, a high spurious free dynamic range (SFDR) may be desired within a particular channel. A high SFDR receiver may digitize this particular channel but may be affected by one or more out-of-channel interferer signals. Such a receiver may have a high SFDR according to its specifications and/or datasheet when tested with only in-channel tones. The one or more out-of-channel interferer signals may be passed by the receiver's band-select filter (e.g., band-select filter 104 as shown in FIG. 1) but may be rejected by the receiver's more selective anti-aliasing filter (e.g., anti-aliasing filter 112 as shown in FIG. 1).

As described in the present disclosure, a model 512 of a nonlinear response of a first receiver 510 (i.e., a narrowband receiver) may be created, including the receiver's response to the one or more out-of-channel interferers. A second receiver 514 (i.e., a wideband receiver) may be used to identify the one or more interferer tones which may not be digitized by the first receiver 510 (i.e., the narrowband receiver). Using a model of the first receiver's (i.e., narrowband receiver 510) response to the one or more out-of-channel interferers, and the knowledge about the one or more out-of-channel interferers from the second receiver (i.e., wideband receiver 514), one or more intermodulation products created by the first receiver (i.e., narrowband receiver 510) in response to the one or more out-of-channel interferers may be cancelled or substantially cancelled. The one or more intermodulation products may be cancelled or substantially cancelled using operator or operation device 516 which may sum digital signals.

Although in some systems it may be necessary for the second receiver 514 (i.e., the wideband receiver) to receive a wider range of signals than the first receiver 510 (i.e., the narrowband receiver), the second receiver 514 does not need to have as high a dynamic range as the first receiver 510, because it may only be used to improve the effective linearity of the first receiver 510. This may allow the separation of design constraints such that, instead of designing a single receiver which is both wideband and has high dynamic range, two receivers could be designed with one being high dynamic range and the other being wideband. In the case of an ideal digital equalization implementation, where all known spurs predicted by the model may be perfectly cancelled or substantially cancelled, the dynamic range of the second receiver 514 may only need to be equal to the desired improvement in the SFDR of the first receiver 510. The may be the case because, by definition, intermodulation products created in response to an interferer signal are of first-order (or higher) proportionality to that interferer, and so smaller amplitudes of interferers will create smaller intermodulation products. Thus identification of the largest intermodulation products may only require identifying the largest interferers.

It should also be noted that the techniques and features described in the present disclosure may be applied as long as a second receiver (e.g., a wideband receiver) can receive a signal band beyond that which can be received by a first receiver (e.g., a narrowband receiver), even if the second receiver's bandwidth is not wider than the first receiver's bandwidth. For example, the channel of a first receiver which may be a narrowband receiver may cover 3 MHz-5 MHz (i.e., 2 MHz bandwidth), but the second receiver which may be a wideband receiver may only receive from 2 MHz-3 MHz (i.e., 1 MHz bandwidth). In other words, in some implementations, the second receiver (e.g., the wideband receiver) may not need to receive a wider range of signals altogether than the first receiver (e.g., the narrowband receiver).

Figure 6:
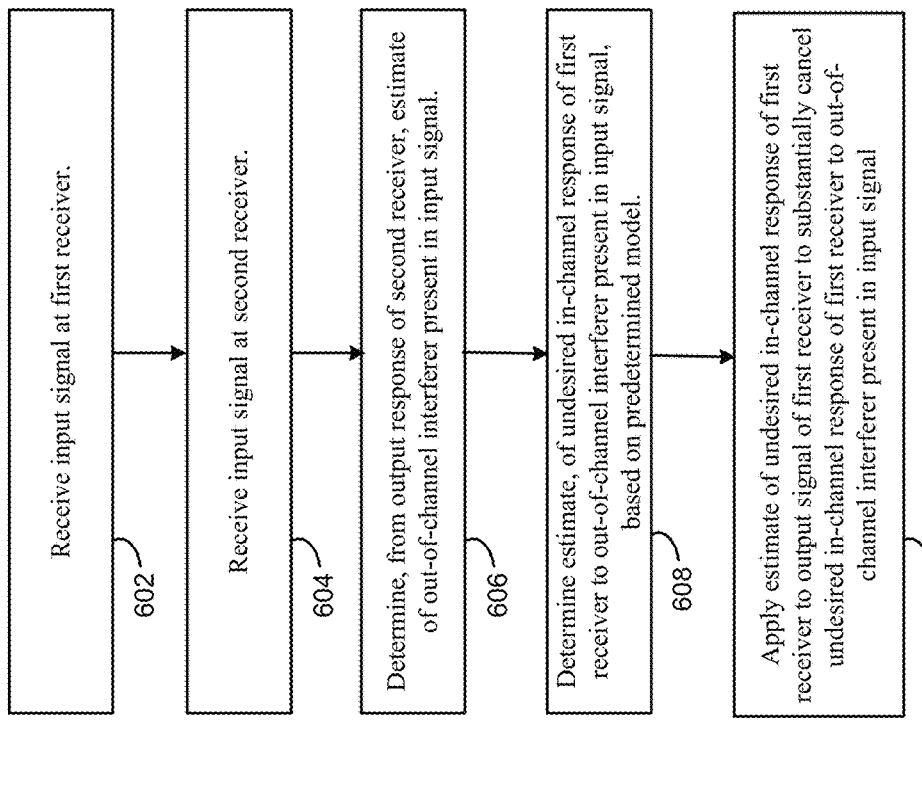
FIG. 6 shows a flow chart of an example process for equalization of a first receiver in accordance with the present disclosure.
Figure 7:
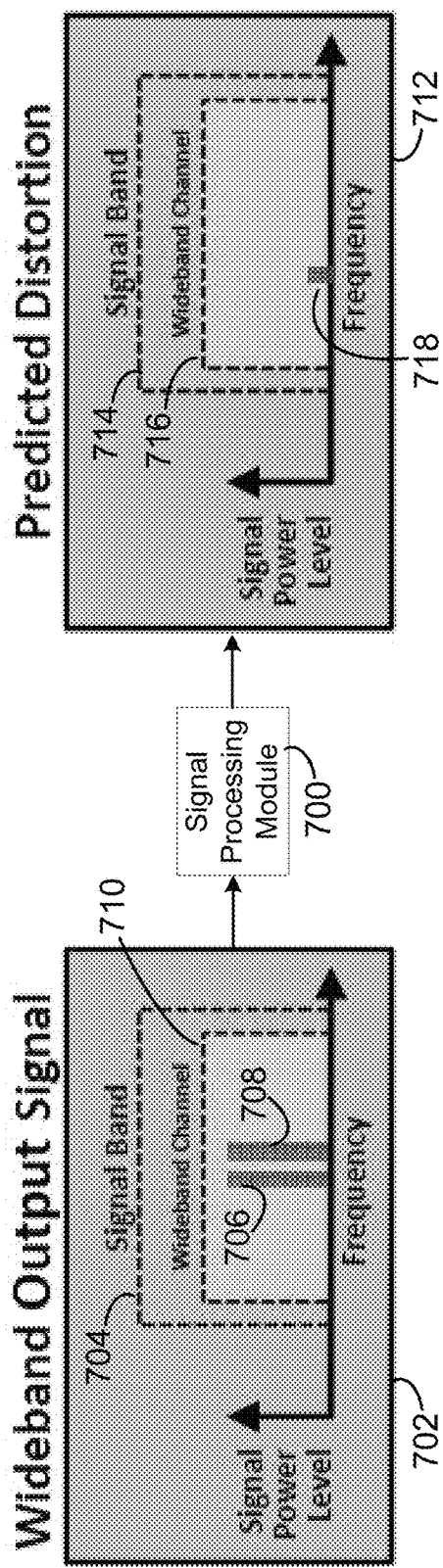
FIG. 7 shows example input and output signal plots for a signal processing module in accordance with the present disclosure.

Referring now also to FIGS. 6 and 7, a method and/or process 600 for wideband equalization of a narrowband receiver is shown. Process 600 may include receiving (602) an input signal (e.g., signal 402 of FIG. 4) at a narrowband receiver (e.g., receiver 510 of FIG. 5 which may be similar to receiver 100 of FIG. 1). Process 600 may also include receiving (604) the input signal (e.g., signal 402 of FIG. 4) at a wideband receiver (e.g., receiver 514 of FIG. 5). Process 600 may further include determining (606), from an output response (e.g., output signal 702 as shown in FIG. 7) of the wideband receiver (e.g., receiver 514), an estimate of an out-of-channel interferer (e.g., out-of-channel interferer 708) present in the input signal (e.g., signal 402 of FIG. 4).

Referring to FIG. 7, an output response of the wideband receiver (e.g., wideband receiver 514) to an input signal such as input signal 402 of FIG. 4 may be output signal 702. Output signal 702 may include signal band 704, tones 706 and 708, and wideband channel 710. Wideband channel 710 may correspond to narrowband channels 406 and 412 of input signal 402 as shown in FIG. 4. When viewed in the context of FIG. 4, if signal 402 is the input signal to narrowband receiver 510 and wideband receiver 514, tone 706 may correspond to tone 408 and may be an in-channel tone, and tone 708 may correspond to tone 410 and may be an out-of-channel tone. In this way, process 600 may determine an estimate of the out-of-channel interferer present in the input signal as out-of-channel interferer 708.

Process 600 may additionally determine (608) an estimate, of an undesired in-channel response (e.g., undesired response 718) of the narrowband receiver (e.g., receiver 510 of FIG. 5 which may be similar to receiver 100 of FIG. 1) to the out-of-channel interferer (e.g., out-of-channel interferer 708) present in the input signal, based on a predetermined model. The predetermined model may be stored at a signal processing module 700. Signal processing module 700 may include a single processor or a combination of processors and one or more memory modules to store the data such as the predetermined model and/or one or more tables or mathematical representations corresponding to the predetermined model. Signal processing module 700 may also run one or more applications or software modules which estimate the undesired in-channel response based on the predetermined model.

The estimated undesired in-channel response or intermodulation product may also be referred to as the predicted distortion and may be represented by signal 712. Signal 712 may include signal band 714 and wideband channel 716. Wideband channel 716 may correspond to narrowband channels 406 and 412 of input signal 402 as shown in FIG. 4. As shown in FIG. 7, undesired in-channel response 718 (which may fall in "channel 1") may be estimated to occur due to the presence of out-of-channel interferer 410 present in the input signal 402. Out-of-channel interferer 410 may be estimated in process 600 as tone 708. This is because tone 708, which corresponds to out-of-channel interferer 410 present in the input signal 402 as tone 410, is in "channel 2" but "channel 1" tones may be considered in-channel for the narrowband receiver.

Figure 8:
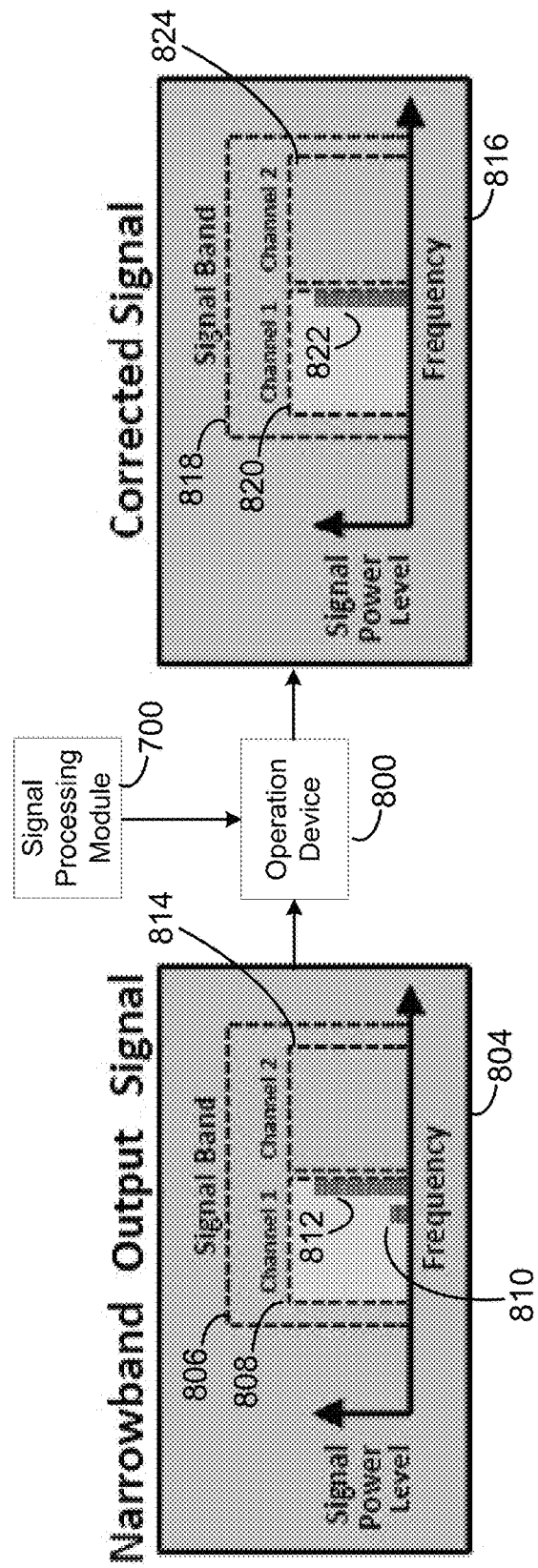
FIG. 8 shows example signal plots depicting correction of an output signal of a first receiver in accordance with the present disclosure.

Referring now also to FIG. 8, process 600 may apply (610) the estimate (e.g., signal 712), of the undesired in-channel response (e.g., undesired response 718) of the narrowband receiver (e.g., receiver 510 of FIG. 5 which may be similar to receiver 100 of FIG. 1) to the out-of-channel interferer (e.g., out-of-channel interferer 410) present in the input signal (e.g., input signal 402), to an output signal (e.g., output signal 804) of the narrowband receiver to substantially cancel an instance of an undesired in-channel response (e.g., undesired response 810 or intermodulation product 810) of the narrowband receiver to the out-of-channel interferer (e.g., out-of-channel interferer 410) present in the input signal (e.g., input signal 402). Output signal 804 of the narrowband receiver may include signal band 806, channel 808 which may include in-channel undesired response 810 and in-channel tone 812, and channel 814 which may include no tones, because they may have been filtered out in the narrowband receiver's signal chain.

For example, signal processing module 700 may apply signal 712 and/or undesired response 718 as the estimate of the undesired in-channel response to output signal 804 of the narrowband receiver via, e.g., operation device 800. As a result, process 600 may output corrected signal 816, which may include signal band 818 having channel 820 including desired tone 822 and channel 824 including no tones.

Figure 9:
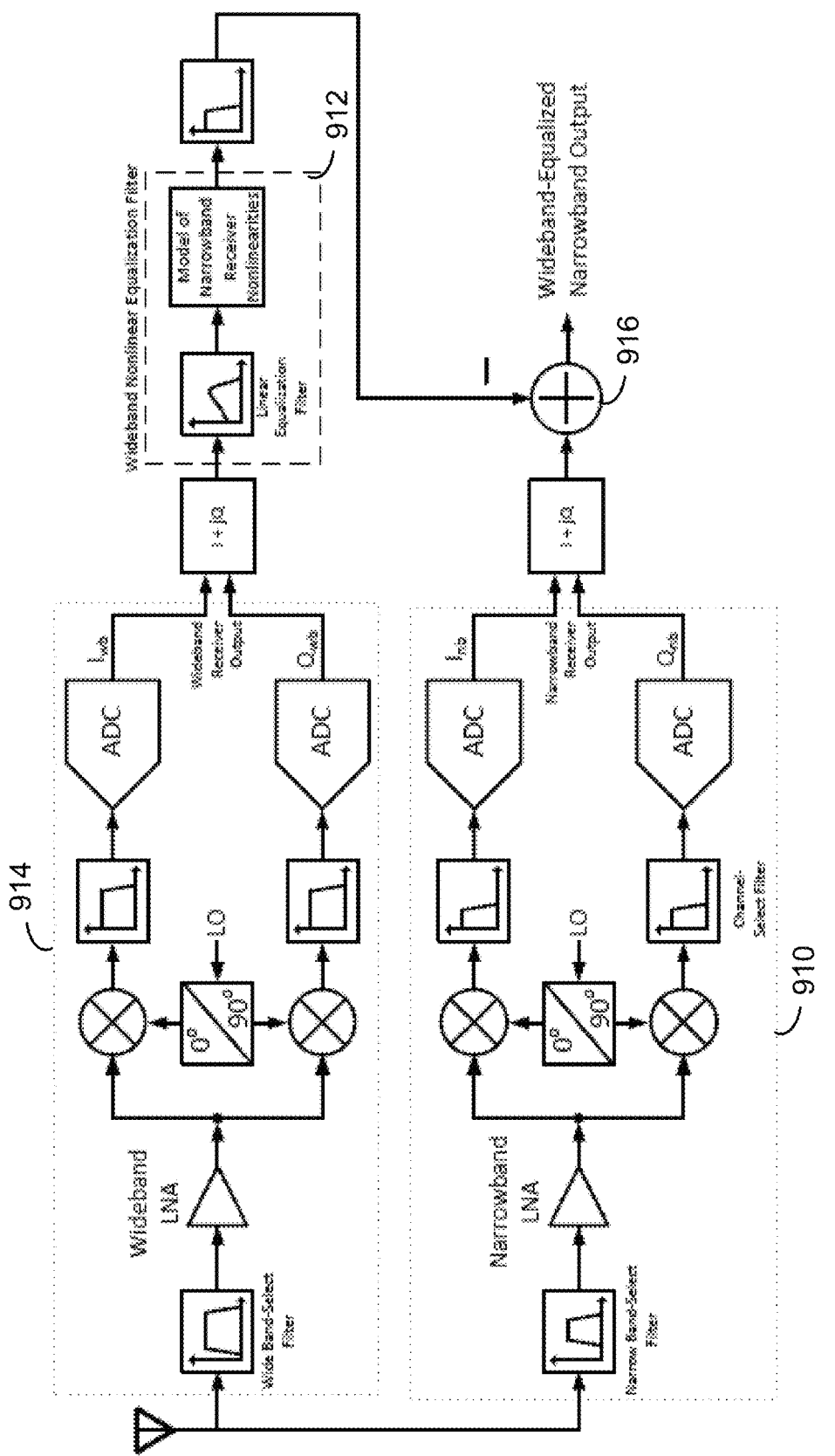
FIG. 9 shows an example architecture and implementation of a system for equalization of a first receiver in accordance with the present disclosure.

Referring now to FIG. 9, an example implementation of a system for wideband equalization of a narrowband receiver is shown. System 900 may include narrowband receiver 910 and wideband receiver 914. System 900 may also include signal processing module 912 and operator or operation device 916. The interior components and architectures shown in FIG. 9 for narrowband receiver 910, wideband receiver 914, and signal processing module 912 are shown for illustrative purposes only and are not intended to be limitations of the present disclosure. Signal processing module 912 may be similar to signal processing module 700 of FIG. 7 and may include a linear equalization filter as shown and a predetermined model (i.e., model of narrowband receiver nonlinearities) as shown.

To model receiver nonlinearities, a Volterra representation of a nonlinear system may be obtained by applying multi-tone signals to the inputs of the nonlinear system and measuring, at the output of the system, the amplitudes of tones at intermodulation frequencies to determine how they relate to the amplitudes of the tones at the input of the system. By sweeping the amplitudes and frequencies of the multi-tone input, a table of values for the Volterra representation may be populated and interpolated to model the nonlinear system. This method may be referred to as Harmonic Probing.

Harmonic probing techniques may be applied in the present disclosure to map wideband to narrowband correspondence and create the predetermined model described above. For example, a Volterra representation of a nonlinear system may be obtained by applying multi-tone signals to the inputs of a combined wideband and narrowband receiver system. The amplitudes of intermodulation products may be measured at the output of the narrowband receiver. Further, the amplitudes of the wideband receiver output may also be measured at the frequencies of the input tones. Then, the intermodulation product amplitudes may be related to amplitudes measured at the output of the wideband receiver at the input tone frequencies (rather than relating the intermodulation amplitudes to the amplitudes of the input tones art). The amplitudes and frequencies of the multi-tone input may be swept to interpolate a model such as the predetermined model described above.

Figure 10:
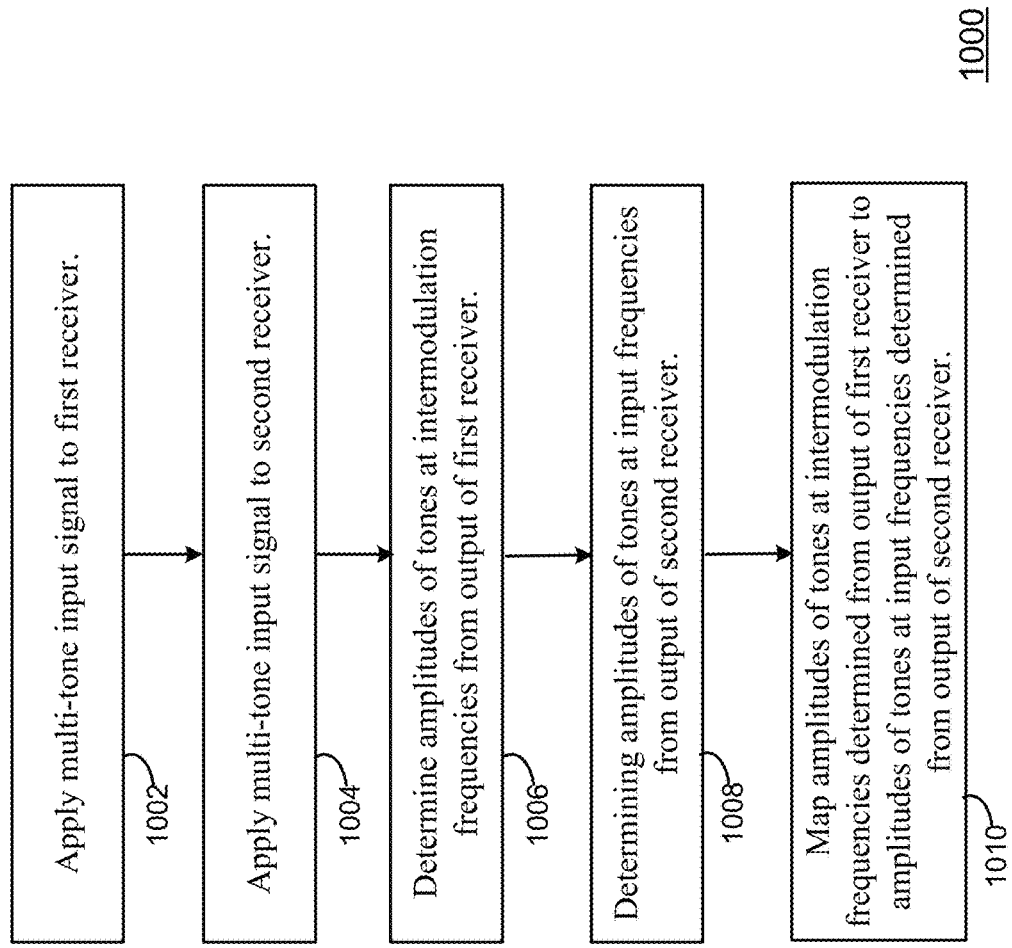
FIG. 10 shows a flow chart of an example process for calibrating a system for equalization of a first receiver in accordance with the present disclosure.
Figure 11:
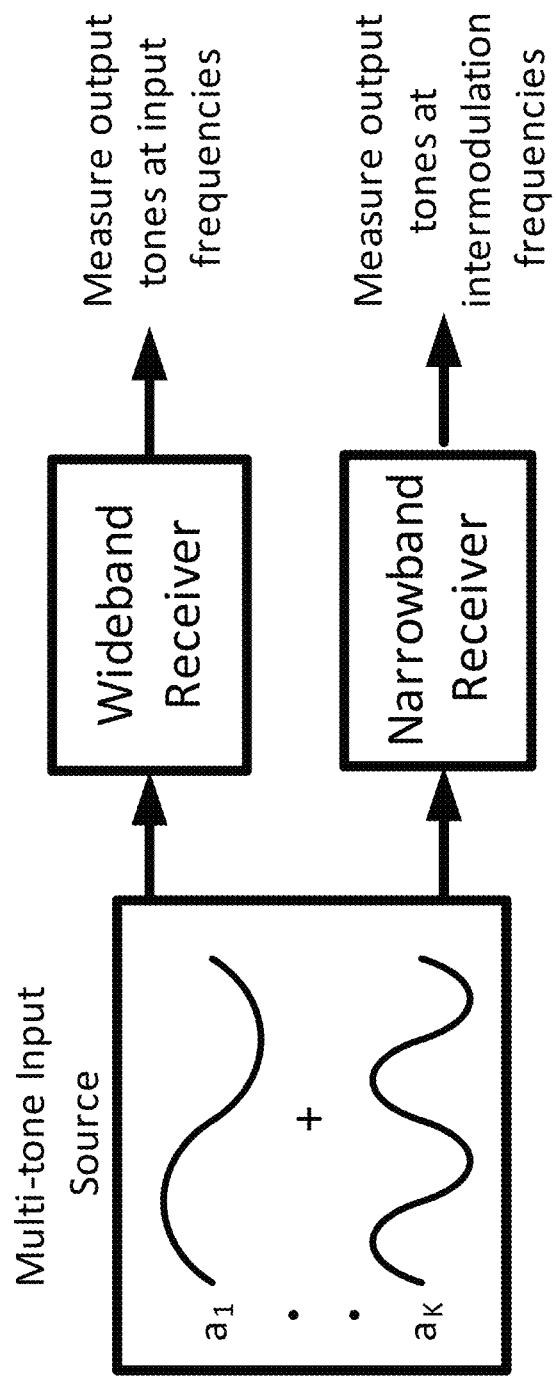
FIG. 11 shows an example diagrammatic flow chart depicting aspects of the example process for calibrating a system for equalization of a first receiver in accordance with the present disclosure.

Referring now to FIGS. 10 and 11 a process 1000 for calibrating a system for wideband equalization of a narrowband receiver is shown. The process 1000 may be used to create the predetermined model described above. The process 1000 may include applying (1002) a multi-tone input signal to a narrowband receiver. The process 1000 may further include applying (1004) the multi-tone input signal to a wideband receiver. The process 1000 may also include determining (1006) amplitudes of tones at intermodulation frequencies from an output of the narrowband receiver. The process 1000 may further additionally include determining (1008) amplitudes of tones at input frequencies from an output of the wideband receiver. Moreover, the process 1000 may include mapping (1010) the amplitudes of the tones at the intermodulation frequencies determined from the output of the narrowband receiver to the amplitudes of the tones at the input frequencies determined from the output of the wideband receiver. The mapping may be used to create the predetermined model or a table, which may be used to achieve wideband equalization of a narrowband receiver as described herein.

The dual system technique (i.e., using narrowband and wideband systems which may be receivers) described in the present disclosure may provide the benefit of canceling out intermodulation products which may not be cancelled by a single receiver using various techniques such as digital NLEQ techniques. Other techniques may include methods for cancelling crosstalk between channels. The techniques and features described in the present disclosure may reduce interference which may be created in a single channel where the cause of this interference may only be seen in another channel. For example, suppose two or more wires carry separate signals, but there is crosstalk between the separate wires, such that that crosstalk can be modelled as a nonlinear system. Then an observation of the signal on the second wire, along with the model of the crosstalk between the two wires, may be used to cancel out any crosstalk-related distortion on the first wire. One method to create the crosstalk model may be through the harmonic probing method described previously in this disclosure, where the signal being observed on the second wire is analogous to a "wideband receiver" and the observation of the signal on the first wire is analogous to the "narrowband receiver". The probing may be used to map and model how tones on the second wire create tones on the first wire. The model may then be used to estimate and cancel an instance of an undesired response in the signal path of the first wire due to the signal on the second wire.

The techniques and features described in the present disclosure may also be used by pairing a wideband low dynamic range receiver with a commercial high dynamic range narrowband receiver such as RF Agile Transceiver (AD9364/AD9361) by Analog Devices. The AD9364 receiver has a third-order input intercept point which, across discrete settings, may be flat with respect to receiver gain. Because the linearity of the receiver is not affected by its gain setting, its linearity is limited by its front-end, before any anti-aliasing filters in the signal chain. The AD9364 receiver may therefore be limited by out-of-channel interferers and the techniques and features described in the present disclosure may be used to improve its SFDR.

In an implementation, the first and second or wideband and narrowband receivers may or may not be considered separate physical entities. For example, the first and second or wideband and narrowband receivers may be part of a system in a single chip, and may or may not be considered separate physical entities. In an implementation, a high speed ADC may come first, and then the first and second or wideband and narrowband receivers may be implemented as separate paths as a single component. For example, they may be co-integrated with the ADC or immediately following it in an FPGA.

While the present disclosure has been shown and described with reference to specific embodiments, examples, and implementations, it should be understood by those skilled in the art that various changes in form and detail may be made therein without departing from the spirit and scope of the present disclosure.

What is claimed is:

1. A method for equalization of a first receiver, the method comprising:
   receiving an input signal at the first receiver wherein the first receiver is a narrowband receiver configured to receive signals in a first channel;
   receiving the input signal at a second receiver wherein the second receiver is a wideband receiver configured to receive a wider signal range than the narrowband receiver including at least a portion of the first channel and at least a portion of a second channel;
   determining, from an output response of the second receiver, an estimate of an out-of-channel interferer present in the input signal wherein the out of channel interferer is outside the first channel and inside the at least the portion of the second channel;
   determining an estimate, of an undesired in-channel response of the first receiver to the out-of-channel interferer outside the first channel and inside the at least the portion of the second channel and present in the input signal, based on a predetermined model, wherein the undesired in-channel response of the first receiver is in the first channel; and
   applying the estimate, of the undesired in-channel response of the first receiver in the first channel to the out-of-channel interferer outside the first channel and inside the at least the portion of the second channel and present in the input signal, to an output signal of the first receiver, to substantially cancel an instance of an undesired in-channel response, of the first receiver in the first channel, to the out-of-channel interferer outside the first channel and inside the at least the portion of the second channel and present in the input signal.

2. The method of claim 1, wherein the wideband receiver is configured to receive a plurality of narrowband channels.

3. The method of claim 1, wherein the wideband receiver comprises a plurality of narrowband receivers.

4. The method of claim 1, wherein determining the estimate, of the undesired in-channel response of the first receiver to the out-of-channel interferer present in the input signal, based on the predetermined model, is performed at a signal processing module in communication with the second receiver and the first receiver.

5. A system for equalization of a first receiver, the system comprising:
   the first receiver wherein the first receiver is a narrowband receiver configured to receive signals in a first channel;
   a second receiver wherein the second receiver is a wideband receiver configured to receive a wider signal range than the narrowband receiver including at least a portion of the first channel and at least a portion of a second channel; and
   a signal processing module in communication with the second receiver and the first receiver, the signal processing module configured to:
      determine, from an output signal generated by the second receiver, an estimate of an out-of-channel interferer present in an input signal of the first receiver wherein the out of channel interferer is outside the first channel and inside the at least the portion of the second channel;
      estimate, an undesired in-channel response of the first receiver to the out-of-channel interferer outside the first channel and inside the at least the portion of the second channel and present in the input signal, based on a pre-determined model, wherein the undesired in-channel response of the first receiver is in the first channel; and
      apply the estimate, of the undesired in-channel response of the first receiver in the first channel to the out-of-channel interferer outside the first channel and inside the at least the portion of the second channel and present in the input signal, to an output signal of the first receiver, to substantially cancel an instance of an undesired in-channel response, of the first receiver in the first channel, to the out-of-channel interferer outside the first channel and inside the at least the portion of the second channel and present in the input signal.

6. The system of claim 5, wherein the wideband receiver is configured to receive a plurality of narrowband channels.

7. The system of claim 5, wherein the wideband receiver comprises a plurality of narrowband receivers.

8. A method of calibrating a system for equalization of a first receiver, the method comprising:
   applying a multi-tone input signal to the first receiver wherein the first receiver is a narrowband receiver configured to receive signals in a first channel;
   applying the multi-tone input signal to a second receiver wherein the second receiver is a wideband receiver configured to receive a wider signal range than the narrowband receiver including at least a portion of the first channel and at least a portion of a second channel;
   determining amplitudes of tones at intermodulation frequencies from an output of the first receiver;
   determining amplitudes of tones at input frequencies from an output of the second receiver; and
   mapping the amplitudes of the tones at the intermodulation frequencies determined from the output of the first receiver to the amplitudes of the tones at the input frequencies determined from the output of the second receiver.

9. The method of claim 8, further comprising:
   applying the mapping to achieve equalization of the first receiver.

10. The method of claim 8, further, comprising:
    applying the mapping to achieve wideband equalization of the narrowband receiver.

* * * * *